March 17, 1931. O. O'REILLY 1,796,578
PORTABLE BOOTH
Filed Dec. 11, 1928 2 Sheets-Sheet 1
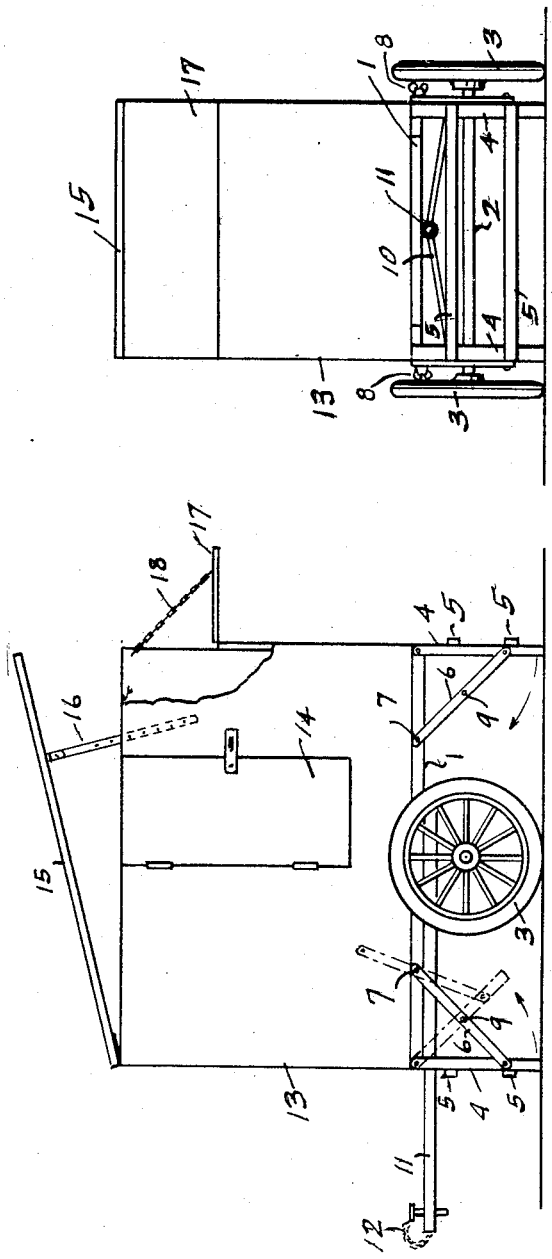
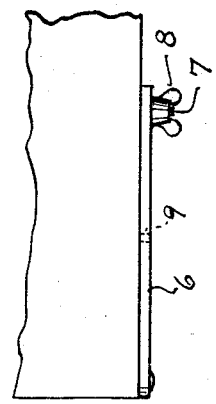
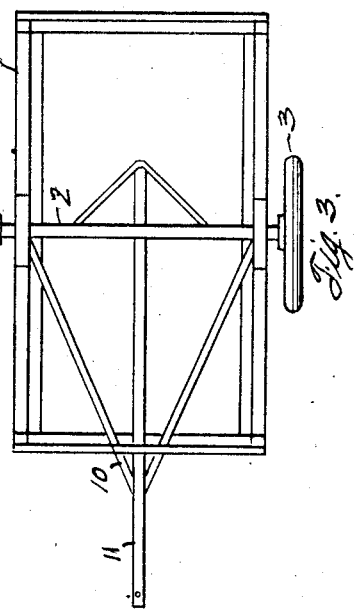
Inventor
Orrill O'Reilly
By Hardway Cathey
Attorneys March 17, 1931. O. O'REILLY 1,796,578
PORTABLE BOOTH
Filed Dec. 11, 1928 2 Sheets-Sheet 2

Inventor
Orrill O'Reilly

By Hardway Tathey
Attorneys

Patented Mar. 17, 1931

1,796,578

UNITED STATES PATENT OFFICE

ORRILL O'REILLY, OF HOUSTON, TEXAS

PORTABLE BOOTH

Application filed December 11, 1928. Serial No. 325,273.

This invention relates to new and useful improvements in a portable booth.

One object of the invention is to provide a novel type of portable booth particularly designed to house a moving picture machine when used for displaying moving pictures out of doors, as for example in public parks and like places.

Another object of the invention is to provide a booth of the character described of such novel construction that it may be completely and securely enclosed to protect its contents against loss or injury, which is readily accessible to the operator of the moving picture machine therein, which is provided with an adjustable cover that may be readily converted into a sloping roof, when the booth is in use, and which may be readily moved about from place to place.

With the above and other objects in view, this invention has particular relation to certain novel features of construction, operation and arrangement of parts, an example of which is given in this specification and illustrated in the accompanying drawings, wherein:—

Figure 1 shows a side view of the booth, partly broken away.

Figure 2 shows a front end view.

Figure 3 shows a plan view of the frame or chassis.

Figure 4 shows a fragmentary view thereof.

Figure 5:
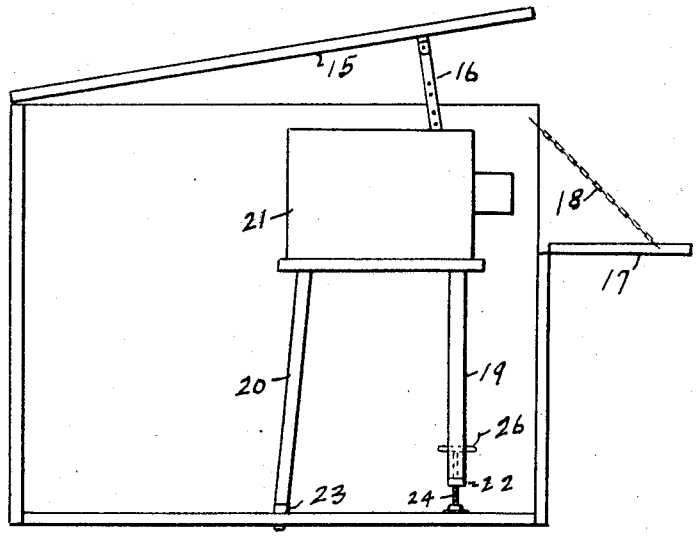
Figure 5 shows a fragmentary side view of the booth with the near wall removed.
Figures 6, 7:
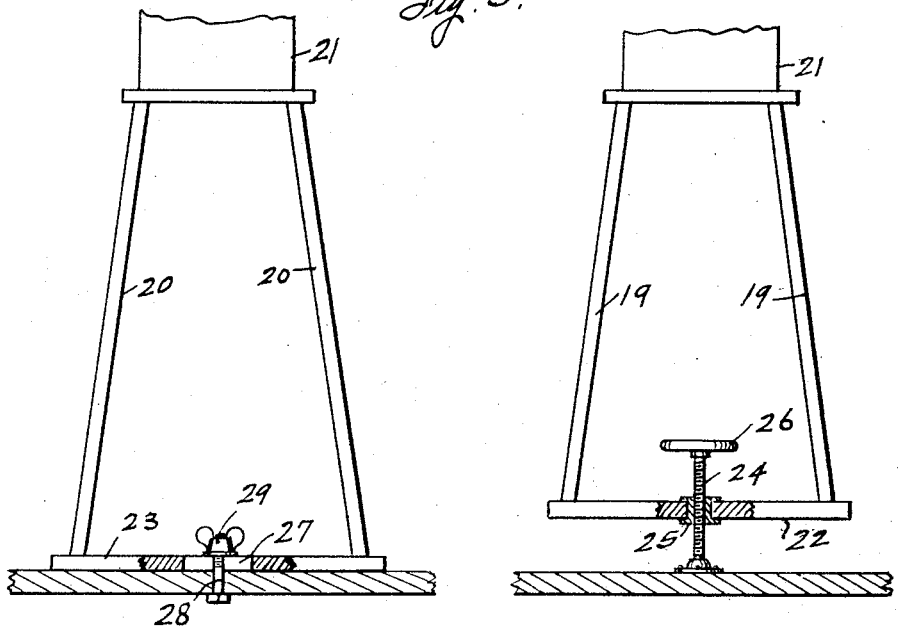
Figures 6 and 7 show respectively, fragmentary sectional views showing the rear and front ends of the moving picture machine.

Referring now more particularly to the drawings, wherein like numerals of reference designate similar parts in each of the figures the numeral 1 designates a rectangular frame which is mounted on the axle 2. The axle is supported by the usual ground wheels 3, 3. Hinged to the front and rear ends of the frame are the pairs of legs 4, 4. The legs of each pair are connected by cross braces as 5, 5. Each leg has a link, as 6, pivoted thereto at its lower end. When the booth is in use the upper end of each link is secured to the corresponding side of the frame by means of a stud bolt 7 which extends out from the frame through a bearing in the upper end of the corresponding link and a clamp nut 8 is screwed onto the stud bolt to prevent the detachment of the link end therefrom. In this manner the legs are secured in position to support the booth.

When it is desired to move the booth about the nuts 8 may be removed and the links 6 detached from the bolts 7 and the legs swung inwardly as shown in dotted lines in Figure 1 and the bearings 9, through said links intermediate the ends thereof, fitted over the stud bolts 7, and the nuts 8 replaced and the legs 4 thus held in inactive position.

There is a forwardly extending A-frame 10 secured to the frame 1 to which the tongue 11 is attached and the free end of the tongue is provided with means 12 by means of which the tongue may be attached to the rear end of an automobile for transporting the booth from place to place.

The body 13, of the booth, is an enclosed, box-like, structure, formed of any suitable material, and having the hinged side door 14 for entrance and exit.

There is a cover 15, on the body, hinged at one end thereto and having its other end free. The free end of this cover may be lifted, as shown in Figure 1, for ventilation purposes, and to give the operator more head room, as well as to give the cover the proper slope to ward off rain, said cover thus forming a roof when the booth is in use. The cover is held in this elevated position by means of the side supporting arms 16, which are pivoted, at their upper ends to said cover, and whose lower ends may be adjustably secured to the corresponding sides of the body in any approved manner.

The lower edge of the upper section 17 of the front wall is hinged thereto so as to swing on a horizontal axis into a horizontal position, and is held in such position by the supporting chains 18. This section 17 should be lowered out of the way so as not to shield the screen when the booth is in use and when in such position forms a convenient shelf for general use.

The booth thus protects the operator and moving picture machine and equipment while the booth is in use, gives the operator ample room for his work and protects said equipment when the same is not in use, and may be readily moved from place to place.

The front and rear legs 19 and 20, of the moving picture machine 21 are mounted on the respective front and rear cross bars 22, 23. There is an externally threaded adjusting shaft 24 threaded through the nut 25, carried by the front bar 22, and the lower end of said shaft has a swiveling connection with the floor of the booth and its upper end has the hand wheel 26 by means of which said shaft may be turned and the front end of the picture machine elevated and lowered. The rear cross bar 23 has an oblong slot 27 therethrough and a bolt 28 is carried by the floor of the booth and extends up through said slot and has a clamp nut 29 screwed thereon which clamps against said bar 27. When it is desired to adjust the rear end of the machine 21, the nut 29 may be loosened and the adjustment made and said nut then tightened. Provision is thus made for adjusting the picture machine so that the picture will be centered on the screen.

While I have shown what I now consider to be the preferred form of the invention it is obvious that mechanical changes may be made therein and equivalents substituted for the parts shown and I reserve the right to make such changes and substitutions as may be comprehended within the principle of the invention.

What I claim is:—

In a device of the character described adapted to be attached to a supporting floor, a front and a rear cross bar on said device, a nut carried by one cross bar, a turnable adjusting shaft having a swiveling connection with the floor and threaded through said nut, the other cross bar having an oblong slot therethrough and a bolt anchored to the floor and working through said slot and having a clamp nut threaded onto the upper end thereof.

In testimony whereof I have signed my name to this specification.

ORRILL O'REILLY.